United States Patent
Kawai et al.

(10) Patent No.: US 10,947,950 B2
(45) Date of Patent: Mar. 16, 2021

(54) HYDROELECTRIC POWER GENERATION APPARATUS

(71) Applicant: NTN CORPORATION, Osaka (JP)

(72) Inventors: Tomoya Kawai, Iwata (JP); Yoshio Fujikawa, Iwata (JP)

( * ) Notice: Subject to any disclaimer, the term of this patent is extended or adjusted under 35 U.S.C. 154(b) by 284 days.

(21) Appl. No.: 15/998,584

(22) PCT Filed: Jan. 23, 2017

(86) PCT No.: PCT/JP2017/002118
§ 371 (c)(1),
(2) Date: Aug. 16, 2018

(87) PCT Pub. No.: WO2017/141631
PCT Pub. Date: Aug. 24, 2017

(65) Prior Publication Data
US 2020/0277928 A1 Sep. 3, 2020

(30) Foreign Application Priority Data
Feb. 18, 2016 (JP) .............................. JP2016-028821

(51) Int. Cl.
*F03B 13/10* (2006.01)
*F03B 11/00* (2006.01)

(52) U.S. Cl.
CPC .............. *F03B 13/10* (2013.01); *F03B 11/00* (2013.01)

(58) Field of Classification Search
CPC ............ F03B 13/10; F03B 11/00; F03B 11/02
See application file for complete search history.

(56) References Cited

U.S. PATENT DOCUMENTS

| 4,289,971 A | * | 9/1981 | Ueda ........................ F03B 13/08 290/52 |
| 4,892,419 A | * | 1/1990 | Inoue .................... F16O 33/043 384/322 |

(Continued)

FOREIGN PATENT DOCUMENTS

| CN | 1348531 A | 5/2002 |
| CN | 201326884 Y | 10/2009 |

(Continued)

OTHER PUBLICATIONS

International Search Report issued in corresponding International Patent Application No. PCT/JP2017/002118, dated Mar. 28, 2017, with English Translation.

(Continued)

*Primary Examiner* — Woody A Lee, Jr.

(57) ABSTRACT

A hydroelectric power generation apparatus includes a hydroelectric power generation module, a beam as a supporting part, and a fixing part. The hydroelectric power generation module includes a rotary blade and a power generator that generates power by rotation of the rotary blade. The supporting part supports the hydroelectric power generation module. The fixing part fixes the supporting part to a water channel. The fixing part includes a bolt to press a surface of a wall portion of the water channel to fix the supporting part to the water channel. The hydroelectric power generation apparatus can dispense with a work performed around the water channel to install the apparatus and also be relocated easily and inexpensively.

10 Claims, 7 Drawing Sheets

(56) References Cited

U.S. PATENT DOCUMENTS

| | | | | |
|---|---|---|---|---|
| 4,948,985 A | * | 8/1990 | Adams | F03B 1/00 |
| | | | | 290/54 |
| 5,767,586 A | * | 6/1998 | Schwanda | F03B 11/063 |
| | | | | 290/54 |
| 6,293,121 B1 | * | 9/2001 | Labrador | B01D 61/10 |
| | | | | 62/304 |
| 2007/0134094 A1 | * | 6/2007 | Gregory | F03B 17/062 |
| | | | | 416/87 |
| 2011/0198850 A1 | * | 8/2011 | Stromstedt | F03B 13/1815 |
| | | | | 290/53 |
| 2014/0110943 A1 | * | 4/2014 | Tagansky | E02B 9/08 |
| | | | | 290/53 |
| 2015/0267675 A1 | * | 9/2015 | Kumano | F03B 17/065 |
| | | | | 290/54 |
| 2019/0072065 A1 | * | 3/2019 | Kawai | F03B 17/061 |
| 2019/0162162 A1 | * | 5/2019 | Fujita | F03B 15/18 |

FOREIGN PATENT DOCUMENTS

| | | | | |
|---|---|---|---|---|
| JP | 54-181305 U | 12/1979 | | |
| JP | 56-139346 U | 10/1981 | | |
| JP | S57-15783 U | 1/1982 | | |
| JP | S60-11950 U | 1/1985 | | |
| JP | S60124586 U | 8/1985 | | |
| JP | S61-159015 U | 10/1986 | | |
| JP | 61-184878 U | 11/1986 | | |
| JP | H04-63670 A | 2/1992 | | |
| JP | H05-202569 A | 8/1993 | | |
| JP | H06-299706 A | 10/1994 | | |
| JP | H08-21596 A | 1/1999 | | |
| JP | 2009114937 | * | 5/2009 | F03B 11/02 |
| JP | 2009114937 A | 5/2009 | | |
| JP | 2013083173 A | 5/2013 | | |
| JP | 2013189862 A | 9/2013 | | |
| WO | 00/52343 A1 | 9/2000 | | |
| WO | 2014021472 A1 | 2/2014 | | |
| WO | WO-2016152641 A1 | * | 9/2016 | F03B 11/02 |
| WO | WO-2019059323 A1 | * | 3/2019 | F03B 7/00 |

OTHER PUBLICATIONS

Chinese Office Action issued in corresponding Chinese Patent Application No. 201780011590.X, dated Nov. 5, 2019, with English translation.

Davis, Barry V., "Low Head Tidal Power: A Major Source of Energy From the Worlds Oceans," IECEC-97 Proceedings of the Thirty-Second Intersociety Energy Conversion Engineering Conference, IEEE, U.S. vol. 3, 27, 1997, pp. 1982-1989.

Extended European search report issued in corresponding European Patent Application No. 17752895.7, dated Jun. 4, 2019.

Japanese Office Action issued with English translation in corresponding Japanese Patent Application No. 2016-028821, dated Jun. 30, 2020, with English translation.

* cited by examiner

HYDROELECTRIC POWER GENERATION APPARATUS

CROSS REFERENCE

This application is the U.S. National Phase under 35 U.S.C. § 371 of International Application No. PCT/JP2017/002118, filed on Jan. 23, 2017, which claims the benefit of Japanese Application No. 2016-028821, filed on Feb. 18, 2016, the entire contents of each are hereby incorporated by reference.

TECHNICAL FIELD

The present invention relates to a hydroelectric power generation apparatus, and more specifically to a hydroelectric power generation apparatus installed in a water channel.

BACKGROUND ART

Conventionally, a hydroelectric power generation apparatus installed in a water channel has been known (for example, see Japanese Utility Model Application No. 60-68478 (Japanese Utility Model Laying-Open No. 61-184878 (microfilmed)). The conventional hydroelectric power generation apparatus disclosed in the above document is fixed to an anchor bolt driven into upper surfaces of opposite ends of a water channel so that the apparatus is not swept away by a water current flowing through the water channel. This is because, to prevent small-sized hydroelectric power generation apparatuses installed in water channels for agricultural water, city water and the like from being swept away by water currents, it is necessary to reliably fix the apparatuses to the water channels.

CITATION LIST

Patent Document

PTD1: Japanese Utility Model Application No. 60-68478 (Japanese Utility Model Laying-Open No. 61-184878 (microfilmed))

SUMMARY OF INVENTION

Technical Problem

For such a small-sized hydroelectric power generation apparatus as installed in a water channel, as described above, however, performing a work to drive an anchor bolt, a work to process a wall surface of a water channel, and the like are a factor inviting an increased cost. More specifically, such a small-sized hydroelectric power generation apparatus utilizing a water channel as described above generates a small amount of power. Accordingly, performing such a work to drive an anchor bolt as described above would make a cost for installing the hydroelectric power generation apparatus excessive relative to the amount of power that the apparatus generates.

In addition, when an anchor bolt is used to fix the hydroelectric power generation apparatus, as described above, the hydroelectric power generation apparatus can only be installed at a location where the anchor bolt is driven. Thus it has been difficult to easily relocate the hydroelectric power generation apparatus as a condition such as a flow rate of a water channel varies.

The present invention has been made to solve the above problems, and an object of the present invention is to provide a hydroelectric power generation apparatus which can dispense with a work performed around a water channel to install the apparatus and also be relocated easily and inexpensively.

Solution to Problem

A hydroelectric power generation apparatus according to the present invention comprises a hydroelectric power generation module, a supporting part, and a fixing part. The hydroelectric power generation module includes a rotary blade and a power generator that generates power by rotation of the rotary blade. The supporting part supports the hydroelectric power generation module. The fixing part fixes the supporting part to a water channel. The fixing part includes a bolt to press a wall surface of the water channel to fix the supporting part to the water channel.

Advantageous Effects of Invention

The present invention can provide a hydroelectric power generation apparatus which can dispense with a work performed around a water channel to install the apparatus and also be relocated easily and inexpensively.

DESCRIPTION OF EMBODIMENTS

Figure 1:
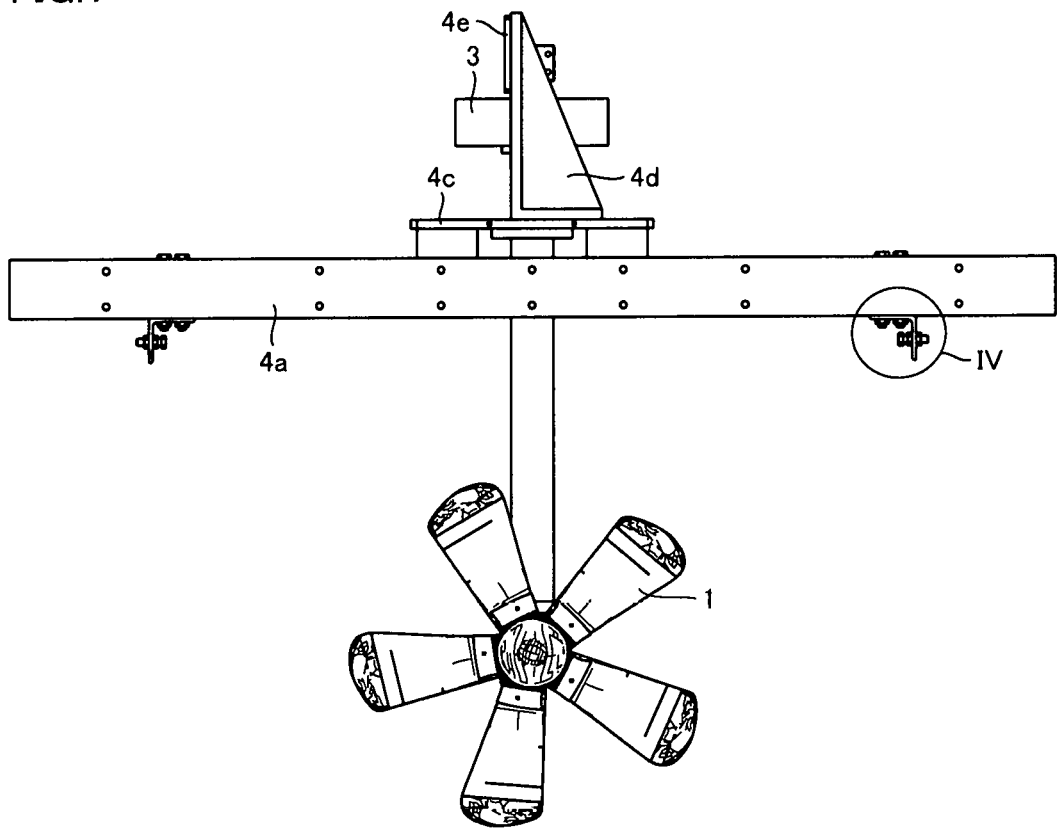
FIG. 1 is a schematic front view of a hydroelectric power generation apparatus according to a first embodiment of the present invention.

Embodiments of the present invention will now be described with reference to the drawings. In the figures, identical or corresponding components are identically denoted and will not be described redundantly.

First Embodiment

<Configuration of Hydroelectric Power Generation Apparatus>

FIGS. 1 to 4 are schematic diagrams for illustrating a hydroelectric power generation apparatus according to the present embodiment. A configuration of the hydroelectric power generation apparatus according to the present embodiment will be described with reference to FIGS. 1 to 4.

The hydroelectric power generation apparatus shown in FIGS. 1 to 4 is a compact and lightweight system installed in an existing water channel for agricultural water, city water, industrial water, and the like and utilizing kinetic energy of running water for power generation. As shown in FIGS. 1 to 4, the hydroelectric power generation apparatus comprises a hydroelectric power generation module including a rotary blade 1, a supporting part including a beam 4, a fixing part including a bolt 5a, and a control device. The hydroelectric power generation module includes rotary blade 1, a gear box 2, and a power generator 3. Rotary blade 1 is a horizontal-axis-type, propeller-type rotary blade. Gear box 2 is connected to rotary blade 1. Power generator 3 is connected to gear box 2 via a support. When rotary blade 1 is rotated by a water current, the rotation of rotary blade 1 is transmitted to power generator 3 via gear box 2 and the support. Power generator 3 generates power by the rotation of rotary blade 1.

The control device controls the output of power generator 3 and rotary blade 1. Maximum power extracted from power generator 3 varies depending on the flow velocity of the water current. Accordingly, the control device measures the flow velocity of the water current, the rotation speed of rotary blade 1, or the power generation voltage of power generator 3, and determines an optimum current value allowing a maximum power to be extracted from power generator 3. Then, the control device controls the hydroelectric power generation module so that the amount of the current of power generator 3 matches the optimum value.

The supporting part supports the hydroelectric power generation module. The supporting part includes two beams 4a and 4b, a mount 4c, a support 4d, and a base plate 4e. The two beams 4a and 4b are aligned in parallel. At the center portions of the two beams 4a, 4b, mount 4c is disposed to connect the two beams 4a, 4b. Mount 4c is fixed to beams 4a, 4b. On an upper surface of mount 4c, two supports 4d are disposed with a spacing therebetween. The two supports 4d are each disposed at an end of mount 4c. Further, supports 4d are positioned to overlap beams 4a, 4b in plan view. Base plate 4e is disposed to connect between the two supports 4d. Power generator 3 is fixed to base plate 4e. Power generator 3 is disposed between mount 4c and base plate 4e. The support of the hydroelectric power generation module has one end connected to a lower surface of mount 4c.

Figure 2:
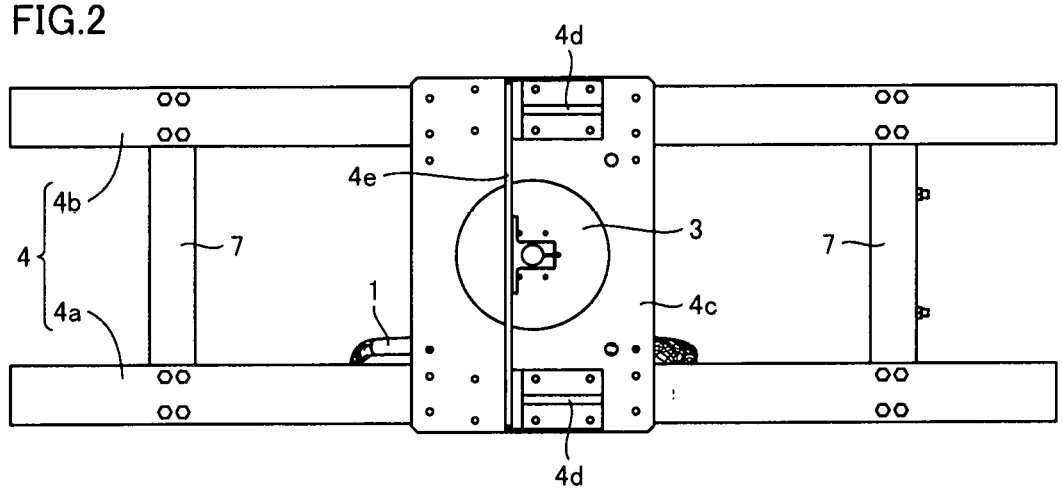
FIG. 2 is a schematic top view of the hydroelectric power generation apparatus shown in FIG. 1.
Figure 3:
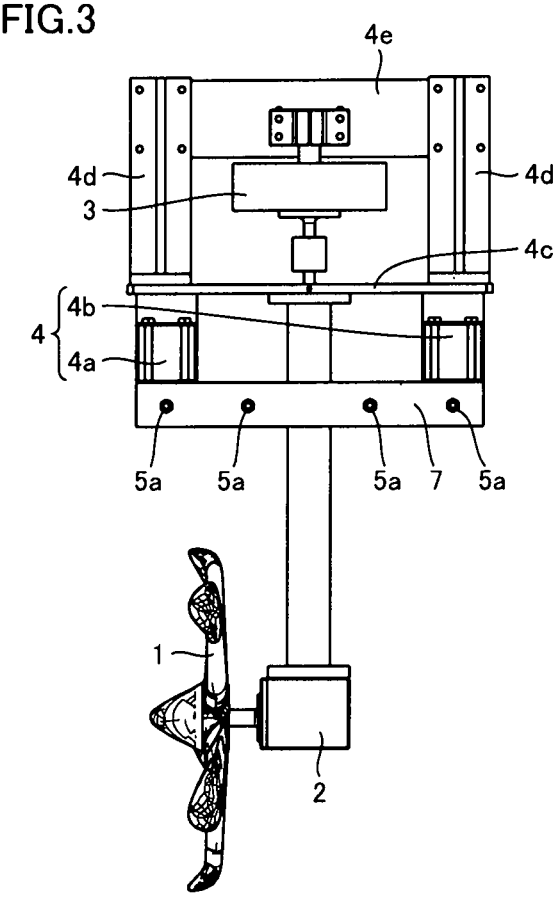
FIG. 3 is a schematic side view of the hydroelectric power generation apparatus shown in FIG. 1.
Figure 4:
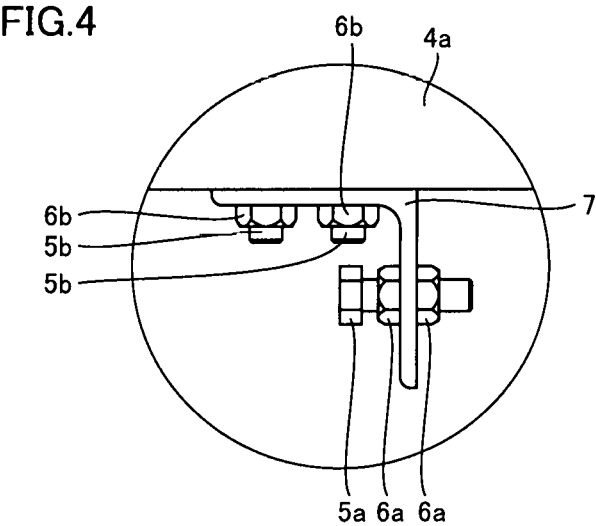
FIG. 4 is an enlarged schematic diagram of a region IV shown in FIG. 1.

The fixing part includes bolt 5a, two L-shaped angles 7, and a nut 6a. As shown in FIG. 2, L-shaped angle 7 is disposed at ends of the two beams 4a, 4b to connect the beams 4a, 4b. L-shaped angle 7 has bolt holes for receiving bolts 5a, 5b therethrough. L-shaped angle 7 is connected to beams 4a, 4b by using bolt 5b passed through a bolt hole and nut 6b. Bolt 5a passed through a bolt hole of L-shaped angle 7 presses a wall surface of a water channel, as will be described hereinafter. Bolt 5a is disposed to extend in a direction in which beams 4a, 4b extend. A plurality of bolts 5a may be provided for a single L-shaped angle 7. For example, as shown in FIG. 3, four bolts 5a are provided for a single L-shaped angle 7. Nut 6a is connected to each bolt 5a. Bolt 5a is fixed to L-shaped angle 7 by nut 6a. Specifically, one of two nuts 6a is fixed to L-shaped angle 7. The nut may be fixed in any method such as welding.

Then, a tip of bolt 5a presses the wall surface of the water channel, as will be described later, to position and thus fix beams 4a and 4b with respect to the water channel.

<Installing Hydroelectric Power Generation Apparatus in Water Channel>

Figure 5:
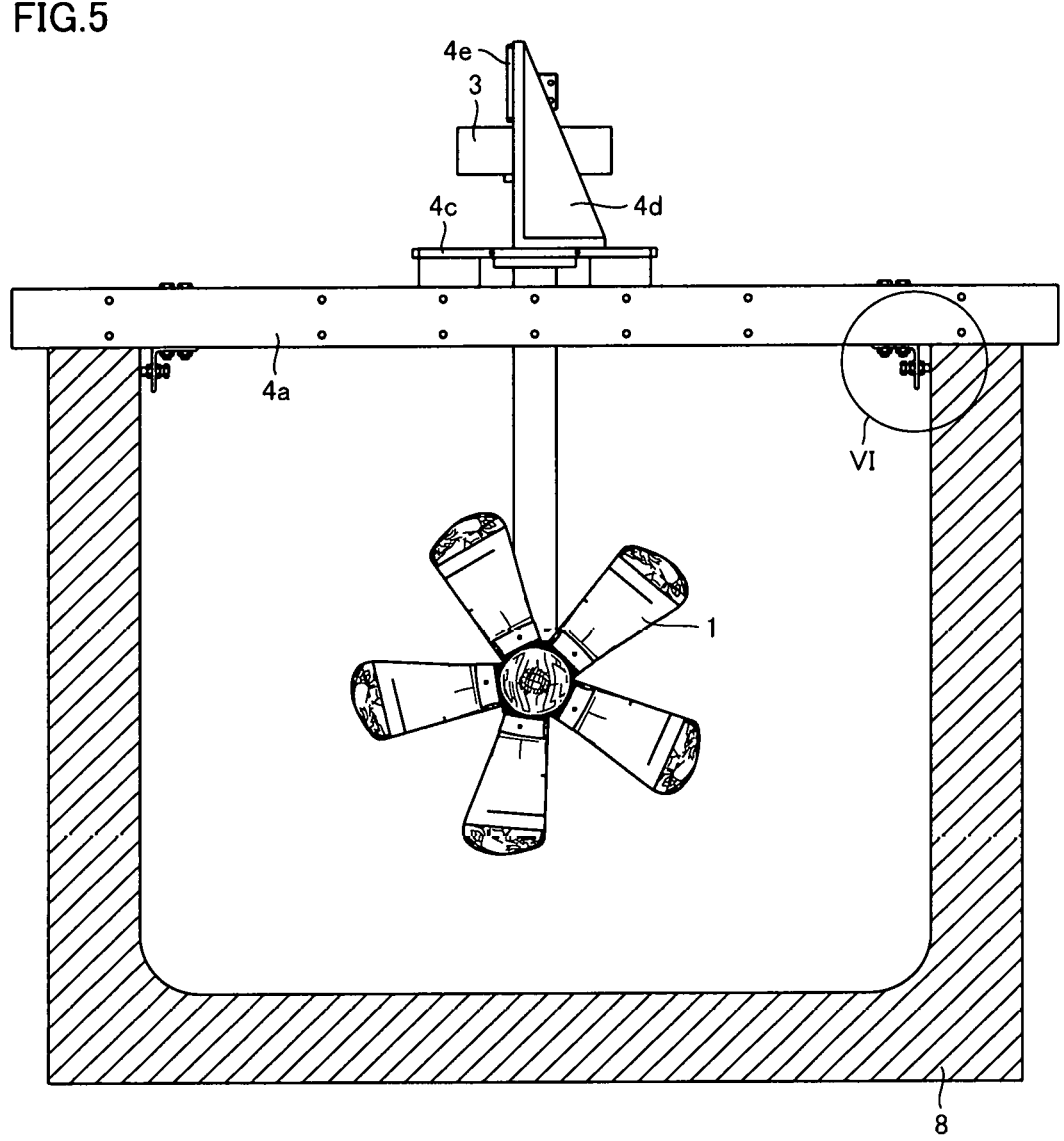
FIG. 5 is a schematic diagram for illustrating the FIG. 1 hydroelectric power generation apparatus installed in a water channel.
Figure 6:
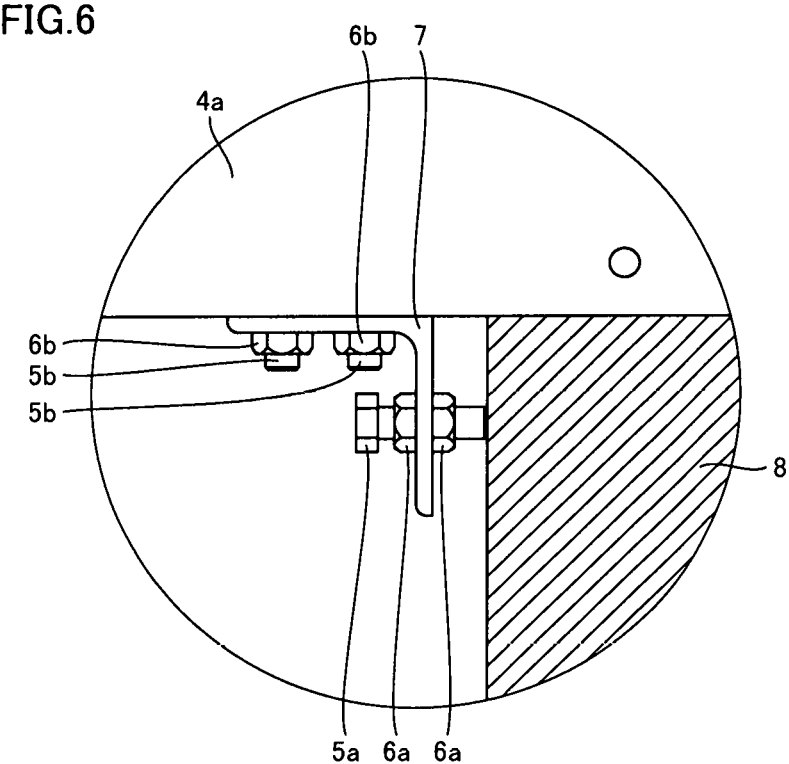
FIG. 6 is an enlarged schematic diagram of a region VI shown in FIG. 5.

FIGS. 5 and 6 are schematic diagrams for illustrating the FIGS. 1-4 hydroelectric power generation apparatus installed in a water channel. With reference to FIGS. 5 and 6, a method for installing a hydroelectric power generation apparatus in a water channel will be described.

Initially, the hydroelectric power generation apparatus is disposed in a water channel at a predetermined position. In doing so, the hydroelectric power generation apparatus has beams 4a, 4b with their ends in contact with an upper surface of a wall portion 8 of the water channel. L-shaped angle 7 and bolt 5a are disposed at a position facing an inner peripheral surface of wall portion 8. In doing so, bolt 5a is previously retracted so that it does not contact the inner peripheral surface of wall portion 8.

Subsequently, bolt 5a is rotated to press a tip of bolt 5a against the surface of wall portion 8. Furthermore, of the two nuts 6a, nut 6a that is not welded to L-shaped angle 7 can also be tightened to fix and thus prevent bolt 5a from being loosened. In this way, the hydroelectric power generation apparatus can be fixed to the water channel.

<Operation of Hydroelectric Power Generation Apparatus>

The hydroelectric power generation apparatus fixed to the water channel has its rotary blade rotated by a current of water flowing through the water channel. The rotary blade generates rotational energy which is in turn transmitted to power generator 3 via gear box 2, a rotation shaft disposed inside the support, and the like. Power generator 3 receives the transmitted rotational energy and converts it into electrical energy. The electrical energy generated by power generator 3 is externally output through an output line or the like.

<Characteristic Configuration, and Function and Effect>

The above-described hydroelectric power generation apparatus comprises a hydroelectric power generation module, a supporting part (beams 4a, 4b, mount 4c, support 4d, and base plate 4e), and a fixing part (L-shaped angle 7, bolt 5a, and nut 6b). The hydroelectric power generation module includes rotary blade 1 and power generator 3 that generates power by rotation of rotary blade 1. The supporting part supports the hydroelectric power generation module. The fixing part fixes the supporting part to the water channel. The fixing part includes bolt 5a that presses a wall surface of the water channel (a surface of wall portion 8) to fix the supporting part to the water channel.

Bolt 5a that presses the surface of wall portion 8 generates frictional force with the surface of wall portion 8, and the frictional force can fix beams 4a, 4b included in the supporting part of the hydroelectric power generation apparatus to the water channel. Furthermore, the frictional force allows the hydroelectric power generation apparatus to bear a force that the apparatus receives from water flowing through the water channel. In other words, the hydroelectric power generation apparatus can be installed in a water channel without a construction work such as attaching an anchor bolt, and hence inexpensively.

Furthermore, the hydroelectric power generation apparatus can be installed in a water channel through a simple working process as described above. Accordingly, it is also easy to relocate the hydroelectric power generation apparatus in the water channel. Further, as the hydroelectric power generation apparatus can be installed through a simple work, the hydroelectric power generation apparatus can be installed at any location in the water channel as temporary measures in case of emergency such as when a disaster strikes.

A hydroelectric power generation apparatus installed in an irrigation canal for agricultural water or the like is relatively small in size and weight, and, without using an anchor bolt or the like as conventional, the hydroelectric power generation apparatus can be sufficiently fixed to the water channel even with frictional force caused by bolt 5a pressing a wall surface of the water channel. This can provide a large degree of freedom in selecting a location in the water channel for installing the hydroelectric power generation apparatus. Furthermore, as the hydroelectric power generation apparatus does not require a construction work and is easily installed, the hydroelectric power generation apparatus can be installed in the water channel at a selected location allowing the most efficient power generation.

<Modification of Hydroelectric Power Generation Apparatus>

Figure 7:
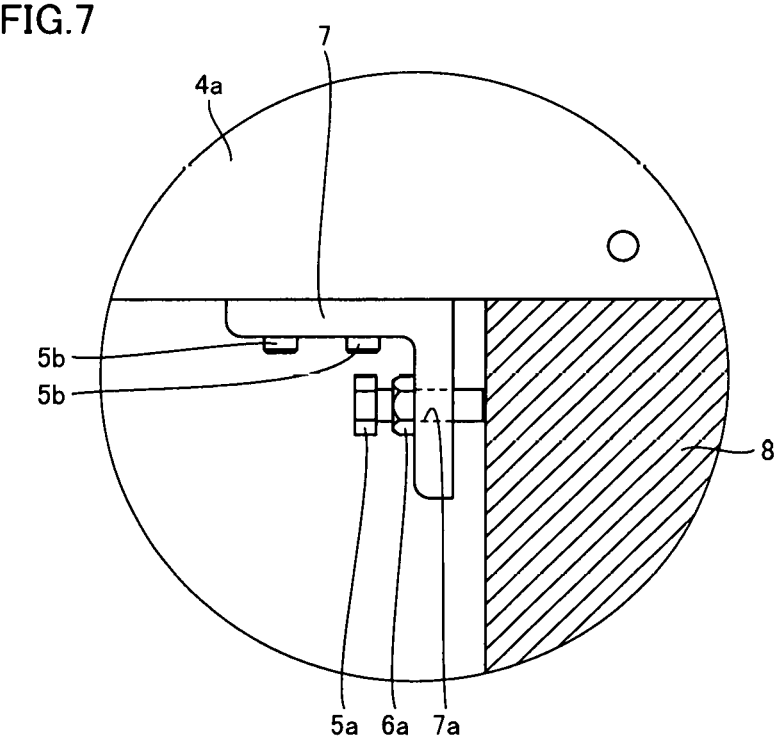
FIG. 7 is a schematic diagram for illustrating a modified example of the hydroelectric power generation apparatus according to the first embodiment of the present invention.

FIG. 7 is a schematic diagram for illustrating a modified example of the hydroelectric power generation apparatus shown in FIGS. 1 to 4. With reference to FIG. 7, the modified example of the hydroelectric power generation apparatus shown in FIGS. 1 to 4 will be described. Note that FIG. 7 corresponds to FIG. 6.

The hydroelectric power generation apparatus shown in FIG. 7 basically has the same structure as the hydroelectric power generation apparatus shown in FIGS. 1 to 4, except that the former has the fixing part composed of L-shaped angle 7 structurally different than the latter. That is, in the hydroelectric power generation apparatus shown in FIG. 7, L-shaped angle 7 serving as a base member included in the fixing part has a threaded hole 7a rather than a simple opening receiving bolt 5a therethrough. Bolt 5a is screwed into threaded hole 7a and thus connected to L-shaped angle 7. Further, nut 6a is connected to bolt 5a to prevent bolt 5a from loosening. This configuration can also achieve an effect similar to that of the hydroelectric power generation apparatus shown in FIGS. 1-4.

Second Embodiment

<Configuration of Hydroelectric Power Generation Apparatus>

Figure 8:
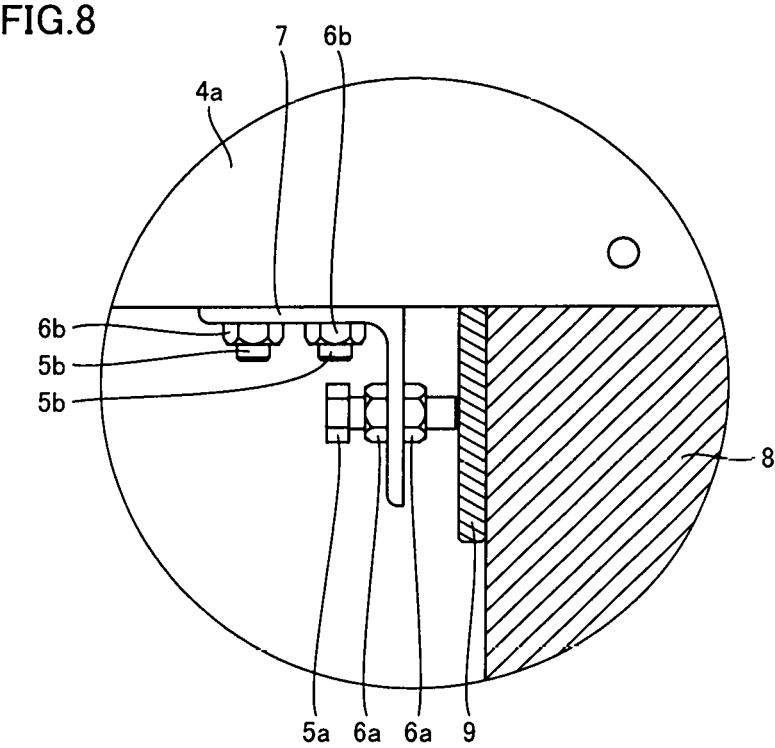
FIG. 8 is a schematic diagram for illustrating a hydroelectric power generation apparatus according to a second embodiment of the present invention.

FIG. 8 is a schematic diagram for illustrating a hydroelectric power generation apparatus according to the present embodiment. The hydroelectric power generation apparatus according to the present embodiment will be described with reference to FIG. 8. Note that FIG. 8 corresponds to FIG. 6.

The hydroelectric power generation apparatus shown in FIG. 8 basically has the same structure as the hydroelectric power generation apparatus shown in FIGS. 1 to 4, except that the former has a plate-shaped member 9 disposed between a tip of bolt 5a configuring the fixing part and a surface of wall portion 8 of the water channel. Plate-shaped member 9 may be of any material that is in the form of a plate. For example, plate-shaped member 9 may be an iron plate.

<Installing Hydroelectric Power Generation Apparatus in Water Channel>

The method of installing the hydroelectric power generation apparatus shown in FIG. 8 in a water channel is basically the same as the method described with reference to FIGS. 5 and 6, although plate-shaped member 9 is disposed between bolt 5a and wall portion 8 of the water channel when bolt 5a is rotated and pressed against wall portion 8. Plate-shaped member 9 can be disposed in any manner. For example, a temporary fixing member such as an adhesive tape may be used to temporarily fix plate-shaped member 9 to wall portion 8 or the tip of bolt 5a. In this way, bolt 5a can be pressed against wall portion 8 of the water channel to fix the hydroelectric power generation apparatus to the water channel.

<Characteristic Configuration, and Function and Effect>

In the hydroelectric power generation apparatus as described above, the fixing part includes plate-shaped member 9 disposed on the side of the tip of bolt 5a and located between bolt 5a and a wall surface of a water channel (or a surface of wall portion 8). When this case is compared with a case with bolt 5a having a tip directly in contact with the wall surface of the water channel, the former allows the wall surface to be pressed in a region having a larger area than the latter. That is, the former can reduce the contact surface pressure in that region. This can suppress a problem such as damage to the wall surface that would be caused as it otherwise would experience excessive stress in a small area.

Further, the hydroelectric power generation apparatus can be connected to the water channel on a surface of wall portion 8 over a large area, and hence fixed to the water channel more firmly.

<Modification of Hydroelectric Power Generation Apparatus>

Figure 9:
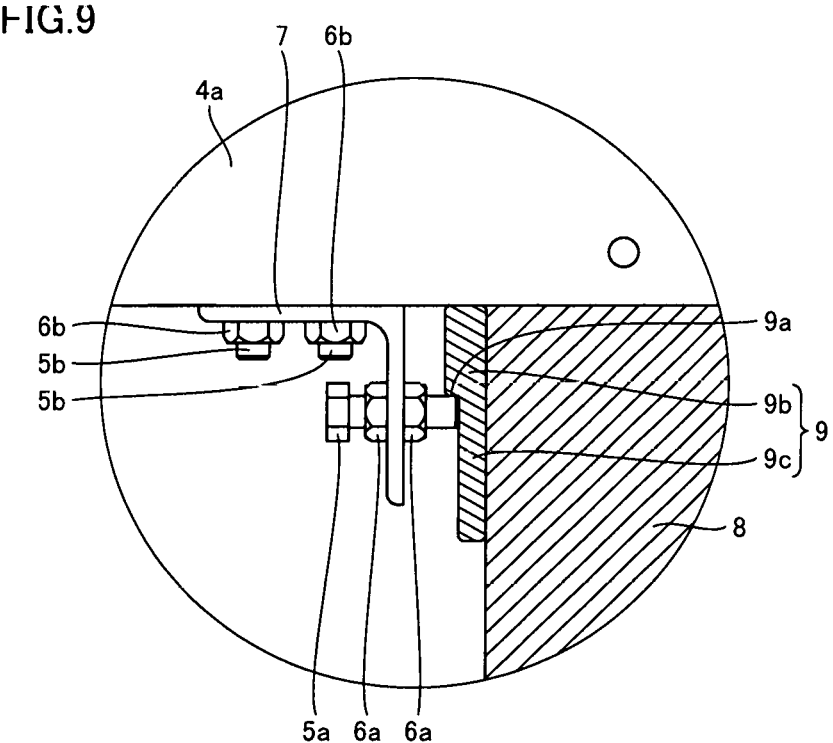
FIG. 9 is a schematic diagram for illustrating a first modified example of the hydroelectric power generation apparatus shown in FIG. 8.
Figure 10:
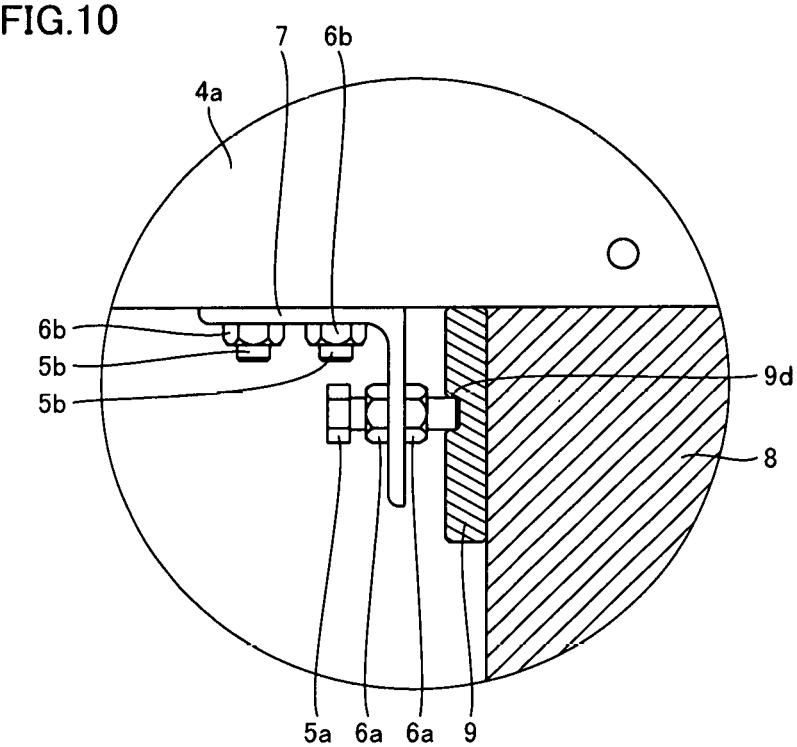
FIG. 10 is a schematic diagram for illustrating a second modified example of the hydroelectric power generation apparatus shown in FIG. 8.

FIGS. 9 and 10 are schematic diagrams for illustrating a modified example of the hydroelectric power generation apparatus shown in FIG. 8. With reference to FIGS. 9 and 10, the modified example of the hydroelectric power generation apparatus shown in FIG. 8 will be described. Note that FIGS. 9 and 10 correspond to FIG. 8.

The hydroelectric power generation apparatus shown in FIG. 9 basically has the same structure as the hydroelectric power generation apparatus shown in FIG. 8, except that the former has plate-shaped member 9 different in shape than the latter. More specifically, plate-shaped member 9 shown in FIG. 9 has a step 9a in contact with the tip of bolt 5a. Step 9a is formed at a boundary portion between a thick portion 9b of plate-shaped member 9 and a thin portion 9c of plate-shaped member 9.

In this case an effect similar to that of the hydroelectric power generation apparatus shown in FIG. 8 can be obtained, and allowing bolt 5a to have the tip brought into contact with plate-shaped member 9 at step 9a can prevent a relative positional displacement of bolt 5a and plate-shaped member 9. Further, when a construction work is conducted to install the hydroelectric power generation apparatus, or bolt 5a pressed against the wall surface of the water channel is loosened, or the like, step 9a of plate-shaped member 9 can be caught by the tip of bolt 5a to suppress a problem such as plate-shaped member 9 escaping from bolt 5a and thus falling.

The hydroelectric power generation apparatus shown in FIG. 10 basically has the same structure as the hydroelectric power generation apparatus shown in FIG. 8, except that the former has plate-shaped member 9 different in shape than the latter. That is, plate-shaped member 9 shown in FIG. 10 has a recess 9d receiving the tip of bolt 5a. Instead of recess 9d, a through hole penetrating plate-shaped member 9 may be formed. Further, recess 9d or the through hole may have an internal surface threaded to connect to bolt 5a.

In that case, allowing bolt 5a to have the tip in contact with plate-shaped member 9 in recess 9d can prevent easy positional relative displacement of bolt 5a and plate-shaped member 9. Further, when a construction work is conducted to install the hydroelectric power generation apparatus, or the like, bolt 5a can have a tip inserted in recess 9d of plate-shaped member 9 to suppress a problem such as plate-shaped member 9 escaping from bolt 5a and thus falling.

Third Embodiment

<Configuration of Hydroelectric Power Generation Apparatus>

Figure 11:
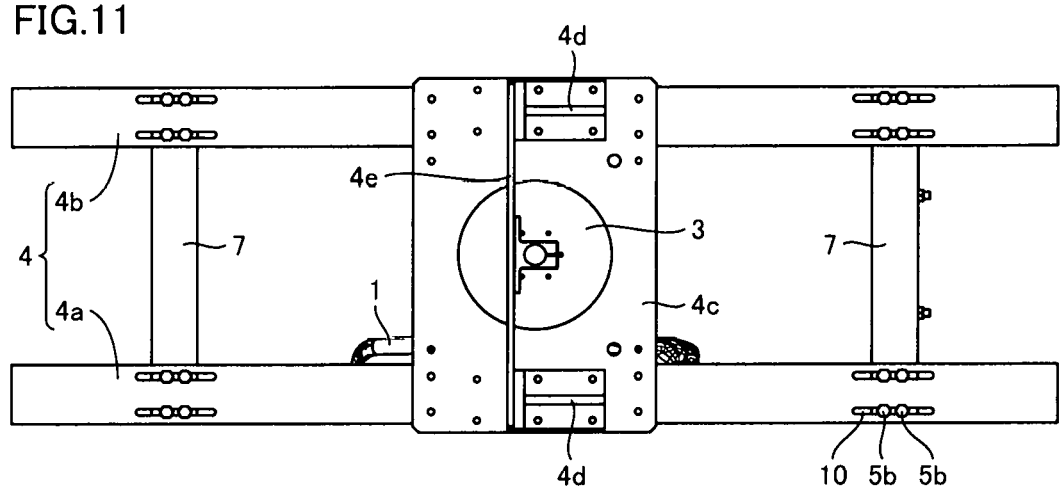
FIG. 11 is a schematic diagram for illustrating a hydroelectric power generation apparatus according to a third embodiment of the present invention.

FIG. 11 is a schematic diagram for illustrating a hydroelectric power generation apparatus according to the present embodiment. The hydroelectric power generation apparatus according to the present embodiment will be described with reference to FIG. 11. Note that FIG. 11 corresponds to FIG. 2.

The hydroelectric power generation apparatus shown in FIG. 11 basically has the same structure as the hydroelectric power generation apparatus shown in FIGS. 1 to 4, except that the former has beams 4a, 4b configuring the supporting part and L-shaped angle 7 configuring the fixing part connected together via a portion configured differently than the latter. Specifically, beams 4a and 4b have an elongate hole 10. L-shaped angle 7 and beams 4a, 4b are connected by bolt 5b inserted through elongate hole 10 and thus fixed to beams 4a, 4b. By changing the position of bolt 5b in elongate hole 10, the position of L-shaped angle 7 with respect to beams 4a, 4b can be changed. That is, L-shaped angle 7 is displaceably connected to beams 4a and 4b.

<Characteristic Configuration, and Function and Effect>

In the above-described hydroelectric power generation apparatus, the fixing part including L-shaped angle 7 is displaceably connected to, the supporting part including beams 4a, 4b. In that case, the position of the fixing part with respect to the supporting part can be easily changed. This allows the hydroelectric power generation apparatus to be installed in water channels of different widths.

Note that the position of L-shaped angle 7 with respect to beams 4a and 4b may be changed by a configuration different from the above-described configuration using elongate hole 10. For example, a plurality of holes receiving bolts 5b may be formed in beams 4a, 4b in a direction in which beams 4a, 4b extend, and the position of L-shaped angle 7 with respect to beams 4a, 4b may be changed by changing the hole receiving bolt 5b. Alternatively, L-shaped angle 7 may have an elongate hole receiving bolt 5b. Alternatively, L-shaped angle 7 may have a plurality of holes receiving bolt 5b in the direction in which beams 4a and 4b extend.

Fourth Embodiment

<Configuration of Hydroelectric Power Generation Apparatus>

Figure 12:
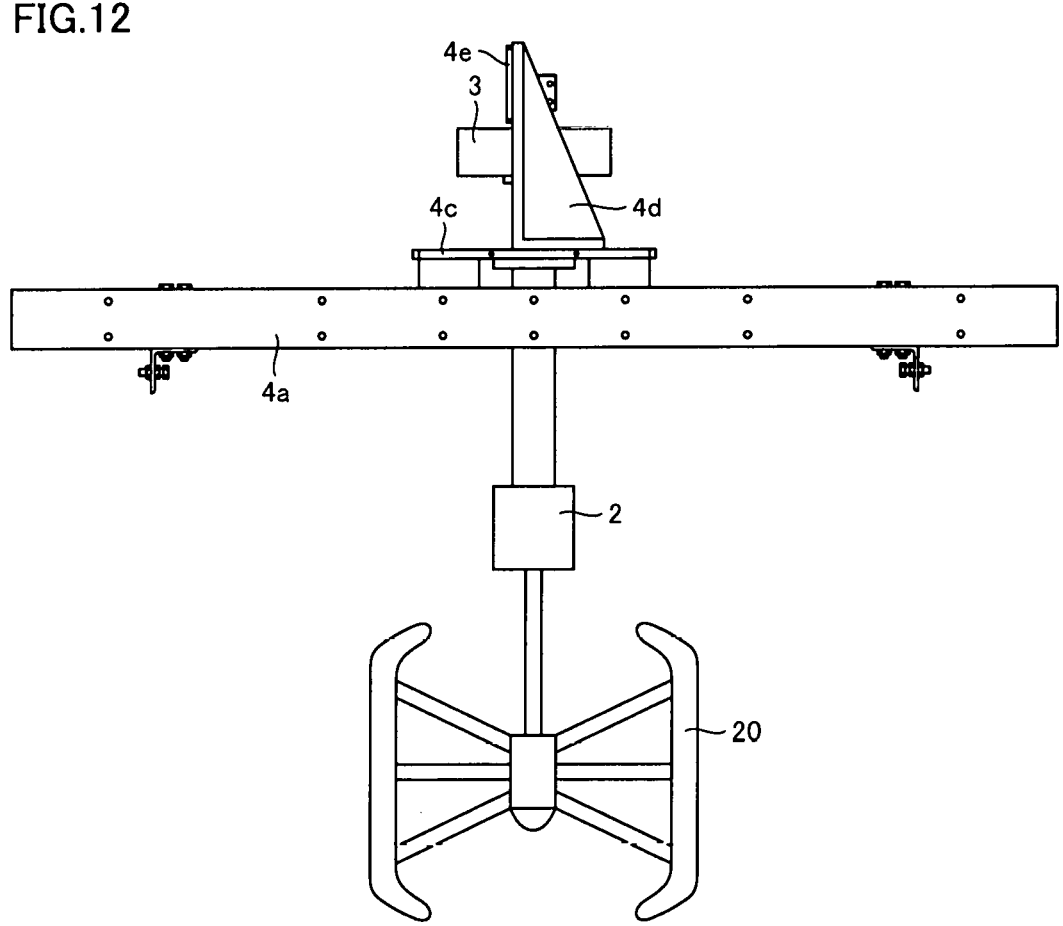
FIG. 12 is a schematic diagram for illustrating a hydroelectric power generation apparatus according to a fourth embodiment of the present invention.

FIG. 12 is a schematic diagram for illustrating a hydroelectric power generation apparatus according to the present embodiment. The hydroelectric power generation apparatus according to the present embodiment will be described with reference to FIG. 12. Note that FIG. 12 corresponds to FIG. 1.

The hydroelectric power generation apparatus shown in FIG. 12 basically has the same structure as the hydroelectric power generation apparatus shown in FIGS. 1-4, except that the former has a rotary blade different in shape than the latter. The hydroelectric power generation apparatus shown in FIG. 12 does not have a horizontal-axis-type, propeller-type rotary blade and instead has a vertical-axis-type rotary blade 20. This configuration can also achieve an effect similar to that of the hydroelectric power generation apparatus shown in FIGS. 1-4.

The above-described hydroelectric power generation apparatus can have rotary blade in any form.

While embodiments of the present invention have been described as above, the embodiments can be variously modified. Further, the present invention is not limited in scope to the above-described embodiments. The scope of the present invention is defined by the terms of the claims, and is intended to include any modifications within the meaning and scope equivalent to the terms of the claims.

INDUSTRIAL APPLICABILITY

The present invention is suitably applied to a small-sized hydroelectric power generation apparatus installed in an irrigation canal or the like, in particular.

REFERENCE SIGNS LIST 1, 20: rotary blade; 2: gear box; 3 power generator; 4, 4a, 4b: beam; 4c mount; 4d: support; 4e: base plate; 5a, 5b: bolt; 6a, 6b: nut; 7; L-shaped angle; 7a: threaded hole; 8: wall portion of water channel; 9: plate-shaped member; 9a: step; 9b: thick portion; 9c: thin portion; 9d: recess; 10: elongate hole.

The invention claimed is:

1. A hydroelectric power generation apparatus comprising:
a hydroelectric power generation module including a rotary blade and a power generator configured to generate power by rotation of the rotary blade;
a supporting part that supports the hydroelectric power generation module; and
a fixing part that fixes the supporting part to a water channel,
wherein the fixing part includes a plate-shaped member a bolt, and
wherein the plate-shaped member is pressed against a wall surface of the water channel using the bolt such that the plate-shaped member is disposed between a tip of the bolt and the wall surface of the water channel.

2. The hydroelectric power generation apparatus according to claim 1, wherein the fixing part includes:
a base member having a threaded hole to receive the bolt; and
a nut connected to the bolt.

3. The hydroelectric power generation apparatus according to claim 1,
wherein the fixing part includes a L-shaped base member,
wherein the L-shaped base member includes 1) a bolt hole, 2) a first member fixed to the supporting part, and 3) a second member including the bolt hole for receiving the bolt, and
wherein the bolt is inserted into the bolt hole of the second member of the L-shaped base member.

4. The hydroelectric power generation apparatus according to claim 1,
wherein the plate-shaped member has a step,
wherein the tip of the bolt is in contact with the step of the plate-shaped member.

5. The hydroelectric power generation apparatus according to claim 1, wherein the plate-shaped member has a recess to receive the tip of the bolt.

6. The hydroelectric power generation apparatus according to claim 1, wherein the fixing part is displaceably connected to the supporting part.

7. The hydroelectric power generation apparatus according to claim 1, wherein the rotary blade is a horizontal-axis-type, propeller-type rotary blade.

8. The hydroelectric power generation apparatus according to claim 1, wherein the rotary blade is a vertical-axis-type rotary blade.

9. A hydroelectric power generation apparatus comprising:
   a hydroelectric power generation module including a rotary blade and a power generator configured to generate power by rotation of the rotary blade;
   a supporting part that supports the hydroelectric power generation module; and
   a fixing part that fixes the supporting part to a water channel,
   wherein the fixing part includes 1) a plate-shaped member including a step and 2) a bolt to press the plate-shaped member against a wall surface of the water channel such that i) a tip of the bolt is in contact with the step of the plate-shaped member and ii) the plate-shaped member is disposed between the tip of the bolt and the wall surface of the water channel.

10. A hydroelectric power generation apparatus comprising:
    a hydroelectric power generation module including a rotary blade and a power generator configured to generate power by rotation of the rotary blade;
    a supporting part that supports the hydroelectric power generation module; and
    a fixing part that fixes the supporting part to a water channel,
    wherein the fixing part includes 1) a plate-shaped member including a recess and 2) a bolt to press the plate-shaped member against a wall surface of the water channel such that i) the recess of the plate-shaped member receives a tip of the bolt and ii) the plate-shaped member is disposed between the tip of the bolt and the wall surface of the water channel.

* * * * *